Figure 1:
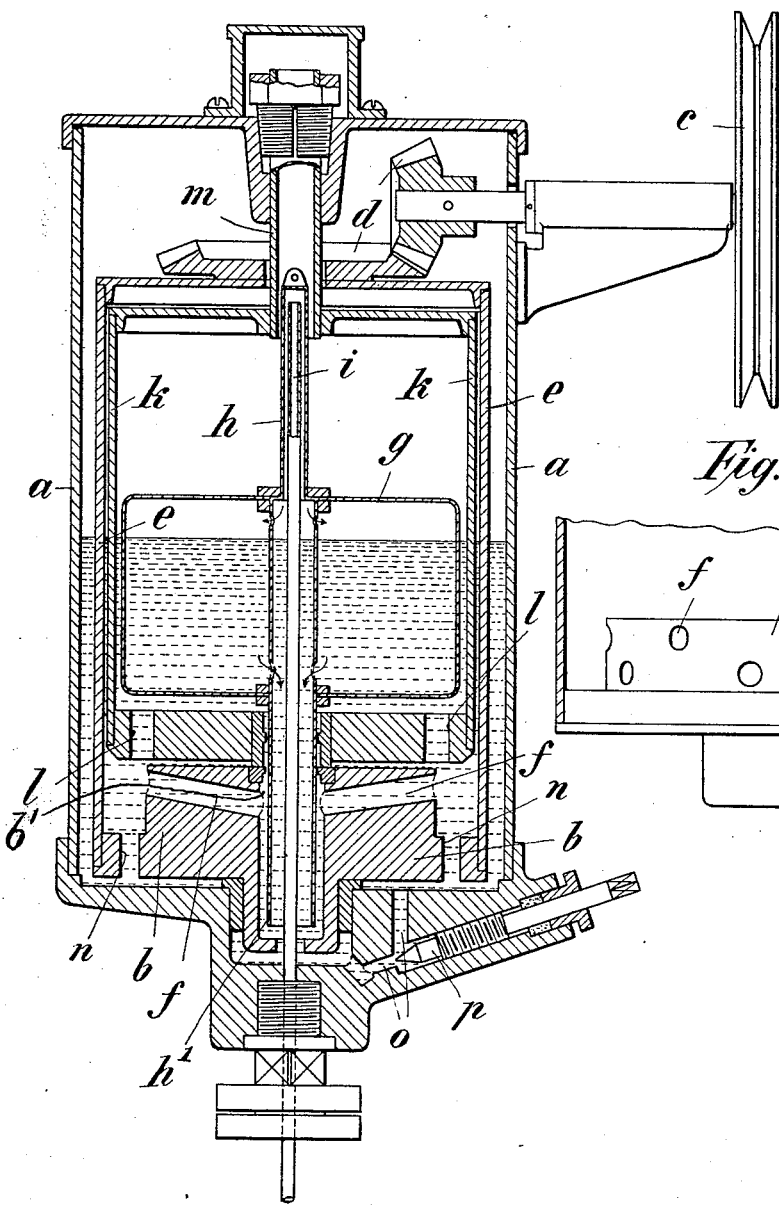

E. O. G. BECKER.
SPEED METER FOR ROTATIVE MOVEMENT.
APPLICATION FILED JULY 11, 1910.

998,947.

Patented July 25, 1911.

Witnesses.
B. Sommers
May Ellis

Inventor
E. O. G. Becker
By Henry Orth
atty.

UNITED STATES PATENT OFFICE.

ERNST OTTO GUSTAV BECKER, OF KIEL, GERMANY.

SPEED-METER FOR ROTATIVE MOVEMENT.

998,947.

Specification of Letters Patent. Patented July 25, 1911.

Application filed July 11, 1910. Serial No. 571,343.

*To all whom it may concern:*

Be it known that I, ERNST OTTO GUSTAV BECKER, a subject of the King of Prussia, and resident of Kiel, in the German Empire, have invented certain new and useful Improvements in Speed-Meters for Rotative Movement, of which the following is a specification.

Heretofore speed-meters for rotative movement in which displacements of a liquid are caused, either by rotating reservoirs or by the centrifugal force of a disk, or by a centrifugal pump or the like to produce changes of air pressure acting on measuring instruments, were frequently found to be deficient, inasmuch as they were either not sufficiently sensitive when sudden changes of speed took place, and therefore adjusted themselves only by degrees, or they gave inexact measurements. The reason for the first deficiency is, that the liquid (mercury), when displaced is subject to a certain amount of friction when finding its way through narrow and long channels, and thus a slowness in the effect of the air pressure changes results. The second deficiency arises from the fact that when a body of liquid is rotated it will be higher at the periphery of the container than at the center and the surface of the liquid will assume the form of a paraboloid and consequently the hydrostatic pressure will be higher at the periphery than at the center. This rise of the liquid at the periphery will increase with the speed of rotation so that a float supported by the liquid will not rise in equal increments for equal speed increments. This necessitates the use of complicated scales that have to be calibrated and modified in accordance with the varying hydrostatic head due to the centrifugal action.

The new speed-meter, which forms the subject matter of the present invention, is considerably more sensitive, and gives reliable and exact results, which are attained by means of a float that produces the variations of air-pressure in a receptacle containing the liquid, and by a rotating disk mounted in the lower part of the receptacle below the float and driven from the shaft the speed of which is to be measured. Moreover, means are provided to prevent that portion of the liquid which is above the rotating disk that carries the float from rotating with that portion of the liquid in the lower part of the receptacle, which latter part of the liquid partakes of the rotation of the disk.

The immobility of the liquid which carries the float maintains the surface of the liquid at a constant level and height. This would, however, not be the case if said liquid were subjected to a rotary movement, as its surface would then assume the form of a paraboloid.

Figure 2:
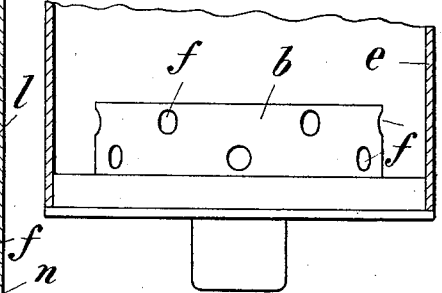

In the accompanying drawing Figure 1 is a diametrical vertical section of a speed-meter embodying my invention, and Fig. 2 is a detail.

In the casing $a$ containing mercury, a horizontal disk $b$ is rotatively journaled and driven from the shaft or other member the rotative speed of which is measured, by the aid of gearing comprising a pulley $c$ and bevel gears $d$ one of which latter is in connection with the disk $b$ by a cylindrical mantle $e$. The disk $b$ is provided with a central opening $b^1$ into which lead a number of channels $f$ which start at the outer rim of the disk. The disk so constructed may be called a centrifugal pump. At a certain distance above the disk a float $g$ is guided in a vertical direction by an upper tube $h$ closed at its upper end and a lower tube $h^1$ open at its lower end. By means of the tube $h^1$ the mercury enters the float from below, leaving a small free space at its upper end.

When the disk is rotated it produces a centrifugal action on the mercury and tends to drive the latter within the channels $f$ outwardly and to draw the mercury from the inside of the float $g$ by suction. The consequence is that the float is raised and the free space within the float is increased. The partial vacuum thus created is also transmitted by way of a tube $i$ projecting into the tube $h$ to any kind of measuring instrument or pressure gage to which the tube $i$ is connected. From this instrument the number of revolutions per unit of time corresponding to the degree of vacuum can be read.

When the float is raised the space below it is increased and filled up by the mercury leaving the float, and for this reason the height of the mercury is not appreciably altered subject to the movement of the float. In order to maintain the mercury prefectly level care is taken to prevent the mercury above the rotating disk $b$ from rotating with the mantle $e$. To this end that part of the mercury is incased within a fixed receptacle $k$ the bottom of which is placed just above the rotating disk $b$ and has openings $l$ through which the mercury enters. Between the receptacle $k$ and the rotating mantle $e$ there is only a small space and the receptacle $k$ is connected in fixed relation with the casing $a$ by a tube $m$ which serves as a guide for the tube $h$.

When the speed of the rotating member decreases the float $g$ will be pressed down into the mercury by the outer pressure until the inner pressure corresponds to the speed to be measured.

In order to enable regulation and to adapt the speed-meter to the measuring apparatus, the mercury to be thrown out by centrifugal force will not only be taken from the inside of the float but part is also taken from the mercury outside of the float, and this mercury is allowed to pass into the central opening of the rotating disk by way of the openings $n$ in the disk and the channels $o$. A valve $p$ is arranged in the casing to enable this amount of the mercury to be regulated by more or less closing the channels $o$ at will. When the channels $o$ are fully opened a comparatively small amount of mercury is sucked out of the float $g$, and therefore a lower vacuum is produced than when the channels are more or less closed by the valve $p$. At a certain speed of rotation the degree of vacuum can be so accommodated to the measuring apparatus that the latter indicates the degree of this vacuum.

I claim—

1. A speed-meter comprising a casing containing mercury, a hollow float in the casing communicating therewith through a central tube extending from the base of the float, a receptacle surrounding the float and provided with apertures in its bottom, a centrifugal pump in the casing below the receptacle and having channels communicating with said tube and receptacle, and means to drive the pump whereby the mercury is sucked from the float and forced into the receptacle.

2. A speed-meter comprising a casing containing mercury, a receptacle in the casing having apertures in its bottom, a hollow float in the receptacle communicating with the casing through a central tube extending from the base of the float, a centrifugal pump below the receptacle having channels communicating with said tube and receptacle, and driving means for the pump situated above the mercury, whereby the mercury is sucked from the float and forced into the receptacle.

3. A speed-meter comprising a casing containing mercury, a receptacle fixed in the casing and having apertures in its bottom, a hollow float in the receptacle communicating with the casing through a central tube extending from the base of the float, a centrifugal pump below the receptacle having channels communicating with said tube and receptacle, and means to drive the pump whereby the mercury is sucked from the float and forced into the receptacle, said driving means being situated above the liquid.

4. A speed-meter comprising a vertical casing containing mercury, a vertical receptacle fixed in the casing and provided with apertures in its bottom, a hollow float having a communicating vertical extension tube closed at its upper end and projecting through the top of the receptacle and a communicating vertical extension tube open at its bottom and projecting through the bottom of the receptacle, a centrifugal pump in the casing below the receptacle having channels communicating with the lower tube and receptacle, and means to drive the pump whereby the mercury is sucked from the float and forced into the receptacle thereby creating a partial vacuum in the upper extension tube.

5. A speed-meter comprising a vertical casing containing mercury, a vertical receptacle fixed in the casing and provided with apertures in its bottom, a hollow float having a communicating vertical extension tube closed at its upper end and projecting through the top of the receptacle and a communicating vertical extension tube open at its bottom and projecting through the bottom of the receptacle, a vacuum tube in said extension tubes communicating with the closed tube above the mercury and adapted to transmit the partial vacuum created in the extension tube, a centrifugal pump in the casing below the receptacle having channels communicating with the lower tube and receptacle, and means to drive the pump whereby the mercury is sucked from the float and forced into the receptacle.

6. A speed-meter comprising a vertical casing containing mercury, a supporting tube fixed in the casing and depending from the top thereof, a receptacle fixed to the tube and provided with apertures in its bottom, a hollow float having a communicating vertical tube closed at its top and slidable in the fixed tube and a communicating vertical tube open at its bottom projecting through the bottom of the receptacle, a centrifugal pump below the receptacle surrounding the latter tube and provided with radial channels and openings near the periphery which communicate with the open bottom tube and channels in the base of the casing, means to drive the pump, and means to regulate the flow of mercury.

7. A speed-meter comprising a vertical casing containing mercury, a supporting tube fixed in the casing depending from the top thereof, a receptacle fixed to the tube and provided with apertures in its bottom, a hollow float having a communicating vertical tube closed at its top and slidable in the fixed tube and a communicating vertical tube open at its bottom projecting through the bottom of the receptacle, a centrifugal pump below the receptacle surrounding the latter tube and provided with radial channels and openings near its periphery which communicate with the open tube and the channels in the base of the casing, means to drive the pump, a vacuum tube projecting through and communicating with the float, channels in the base of the casing communicating with the receptacle, and a valve in the last named channels to regulate the flow of mercury therethrough.

ERNST OTTO GUSTAV BECKER.

Witnesses:
 JULIUS POPKE,
 KURT BUNDE.

Copies of this patent may be obtained for five cents each, by addressing the "Commissioner of Patents, Washington, D. C."